United States Patent Office 3,264,350
Patented August 2, 1966

3,264,350
BIS(AMINOMETHYL-BICYCLO[2:2:1]HEPTYL)
COMPOUNDS
Alfred Renner, Allschwil, and Alex Von Schulthess, Basel, Switzerland, assignors to Ciba Limited, Basel, Switzerland, a Swiss company
No Drawing. Filed June 17, 1963, Ser. No. 288,493
Claims priority, application Switzerland, June 21, 1962, 7,464/62; Dec. 11, 1962, 14,491/62
5 Claims. (Cl. 260—563)

The present invention provides new diamines of the general formula (I)

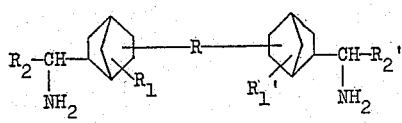

where R represents a divalent radical, more especially

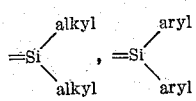

or a divalent aliphatic, cycloaliphatic or araliphatic hydrocarbon radical which may be interrupted by oxygen or substituted by hydroxyl groups or halogen atoms, and where $R_1$, $R_1'$, $R_2$ and $R_2'$ each represents a hydrogen atom or a methyl group.

Among the compounds defined above those which correspond to the general formula (II)

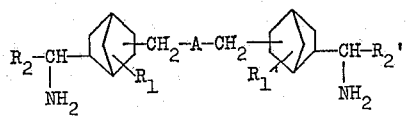

where A represents a divalent aromatic hydrocarbon radical which may be unsubstituted or substituted by one or more than one alkyl group, and $R_1$, $R_1'$, $R_2$ and $R_2'$ have the same meanings as in Formula I, are distinguished by particularly valuable technical properties.

Suitably, $R_1$ in Formula I is a divalent radical selected from the group consisting of

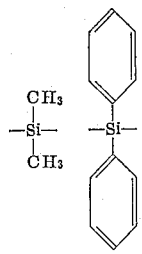

alkylene radical with at the most 5 carbon atoms, -alkylene-O-alkylene-, wherein alkylene has the same meaning as above, and a radical —CH$_2$—A—CH$_2$—, and A in the foregoing definition of $R_1$ and in Formula II is a member selected from the group consisting of the phenylene radical and the phenylene radical substituted by at most 4 methyl groups.

According to the invention the diamines of the Formula I or II are manufactured by reacting a bis(cyclopentadienyl) compound of the formula (III)

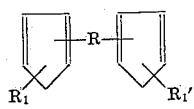

or (IV)

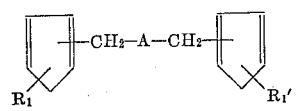

where R, $R_1$ and $R_1'$ and A have the same meaning as in Formula I or II, with acrylonitrile, acrolein or methylvinyl ketone and hydrogenating the resulting Diels-Alder adduct in the known manner in the presence of ammonia.

As di(cyclopentadienyl) compounds of the Formulae III and IV, suitable for use as starting materials in the manufacture of the polyamines of the Formula I, there may be mentioned the following:

Bis(cyclopentadienyl)methane,
Bis(cyclopentadienyl)phenylmethane,
1:5-bis(cyclopentadienyl)pentane,
1:6-bis(cyclopentadienyl)hexane,
1:9-bis(cyclopentadienyl)nonane,
1:4-bis(cyclopentadienyl)-butene-2-,
1:4-bis(cyclopentadienyl)-butine-2,
2:2'-bis(cyclopentadienyl)diisopropyl ether,
Bis-[(cyclopentadienyl)pentenyl]ether,
1:4-bis(cyclopentadienyl)cyclopentene-2,
2:2'-bis(cyclopentadienyl-methyl)spiro-bimeta-dioxane,
Di-cyclopentadienyl-dimethylsilane,
Bis(methyl-cyclopentadienyl)-dimethylsilane,
Di-cyclopentadienyl-diphenylsilane, and more especially
α:α'-Bis(cyclopentadienyl)-para-xylene,
4:6-Bis(cyclopentadienyl-methyl)-1:3-dimethylbenzene, and
1:3-bis(cyclopentadienyl-methyl)-2:4:6-trimethyl-benzene.

The new diamines of the general Formula I are valuable cold-curing agents for epoxy resins, more especially, for example, for the polyglycidyl ether resins accessible, for example, by condensation of polyphenols with epichlorohydrin or glycerol dichlorohydrin in the presence of an alkali.

The aliphatic polyamines, such as diethylenetriamine or triethylenetetramine, hitherto conventionally used for cold-curing epoxy resins react very violently with polyglycidyl ethers, and the resin+curing agent mixtures turn into gels within a few minutes after their preparation. During the curing operation considerable amounts of heat are liberated. Consequently, only relatively small or highly filled castings can be manufactured. When larger castings are manufactured, they often undergo charring and fissures frequently occur during the curing operation. Moreover, polyglycidyl ethers cured with aliphatic polyamines are relatively brittle.

It has already been proposed to use as curing agent for epoxy resins cycloaliphatic diamines, but in general these compounds are not suitable for cold-curing, in fact, even after having been heated for 24 hours at 40° C., a mixture of 4:4'-diaminodicyclohexyl-dimethylmethane and a condensate of epichlorohydrin with bis(para-hydroxypenyl)dimethylmethane in the presence of alkali does not yield a polyglycidyl ether resin which is cured right through.

The aromatic diamines, for example 4:4'-diaminodiphenylmethane, are preeminently suitable for hot-curing epoxy resins.

In contrast thereto the new diamines of the Formula I of the invention not only ensure perfect through-curing of the polyglycidyl ethers at room temperature but they further offer a series of important technical advantages over the aliphatic polyamines. The most important of these advantages are the following:

(a) Longer pot life of the resin+curing agent mixtures;
(b) Lower maximum reaction temperatures during the exothermic curing, which enables mouldings of large size to be manufactured;
(c) Higher impact strength of the cured mouldings without being accompanied by a reduced heat distortion point;
(d) The insignificant odour and low vapour pressure of the new amine curing agents.

The preferred diamines of the invention, corresponding to the Formula II, for example the compound bis-2'-aminomethyl-bicyclo[2:2:1]heptyl-methyl)-xylene - 1:3, display in addition the technically important advantage that with cold-cured castings a heat distortion point according to Martens of, for example, 140° C. can be achieved. Such high heat distortion points in cured epoxy resins could in the past be achieved only by hot-curing, for example with dicarboxylic acid anhydrides, whereas all other polyamines hitherto proposed for cold-curing epoxy resins yielded considerably lower heat distortion points. In some cases, however, it may be of advantage to replace in the curable mixtures a small share (under 25%) of the diamines of the invention by a known polyamine of low viscosity, such as triethylenetetramine, diethylaminopropylamine or α:α'-diamino-metaxylene, with a view to lowering the viscosity of the curable mixture.

Accordingly, the present invention includes also curable mixtures containing (1) an epoxy compound having an epoxide equivalence greater than 1, and (2) a polyamine of the Formula I.

The epoxy compounds having an epoxide equivalence greater than 1, which are incorporated in the curable mixtures of the invention, contain $x$ epoxide groups calculated from the average molecular weight, where $x$ is a whole or fractional number greater than 1.

As is known, the known methods of manufacturing polyepoxy compounds are generally performed with the use of industrial mixtures of compounds having disparate molecular weights, and these mixtures contain in addition compounds whose terminal epoxide groups have undergone partial hydrolysis. Therefore, the analytically found value of the epoxide equivalence of such industrial mixtures need not be a whole number, at least 2, but it must in all cases be greater than 1.

As epoxy compounds of the kind defined above there are suitable, for example:

Alicyclic polyepoxides, such as vinylcyclohexene dioxide, limonene dioxide, dicyclopentadiene dioxide, ethyleneglycol - bis(3:4-epoxy-tetrahydrodicyclopentadien - 8-yl) ether, 3:4-epoxy-tetrahydrodicyclopentadien-8-yl)glycidyl ether; epoxidized polybutadienes or copolymers of butadiene with ethylenically unsaturated compounds, such as styrene or vinyl acetate; compounds containing two epoxycyclohexyl radicals, such as diethyleneglycol-bis(3:4-epoxycyclohexane carboxylate), bis-3:4-[epoxy-cyclohexylmethyl]-succinate, 3:4-epoxy-6-methyl-cyclohexylmethyl-3:4-epoxy-6-methylcyclohexane carboxylate and 3:4-epoxy-hexahydrobenzal-3:4-epoxy-cyclohexane - 1:1 dimethanol.

There are also suitable polyglycidyl esters obtained by reacting a dicarboxylic acid with epichloro-hydrin or dichlorohydrin in the presence of an alkali. Such polyesters may be derived from aliphatic dicarboxylic acids, such as succinic acid or adipic acid, or more especially from aromatic dicarboxylic acids, such as phthalic or terephthalic acid. As examples there may be mentioned: diglycidyl adipate and diglycidyl phthalate.

Likewise suitable are basic polyepoxy compounds obtained by reacting primary or secondary aliphatic or aromatic diamines, such as aniline, toluidine, 4:4'-diaminodiphenylmethane, 4:4'-di-(monomethylamino)-diphenylmethane or 4:4'-diaminodiphenyl sulfone, with epichlorohydrin in the presence of an alkali.

Preferred use is made of polyglycidyl ethers obtained by etherifying a dihydric or polyhydric alcohol or diphenol or polyphenol respectively with epichlorohydrin or dichlorohydrin in the presence of an alkali. These compounds may be derived from glycols, such as ethyleneglycol, diethyleneglycol, triethyleneglycol, 1:3-propyleneglycol, 1:4-butyleneglycol, 1:5-pentanediol, 1:6-hexanediol, 2:4:6-hexanetriol, glycerol or more especially from diphenols or polyphenols, such as resorcinol, pyrocatechol, hydroquinone, 1:4-dihydroxy-naphthalene, phenol+formaldehyde condensates of the resole or novolak type, bis[para - hydroxyphenyl]methane, bis[para - hydroxyphenyl]methylphenylmethane, bis[para-hydroxyphenyl] tolylmethane, 4:4'-dihydroxydiphenyl, bis[para-hydroxyphenyl]sulfone and above all bis[para-hydroxyphenyl]-dimethylmethane.

Particularly suitable are epoxy resins that are liquid at room temperature, for example those from bis[para-hydroxyphenyl]dimethylmethane (=bisphenol A) which contain about 3.8 to 5.8 epoxide equivalents per kg. Such epoxy resins correspond, for example, to the average formula

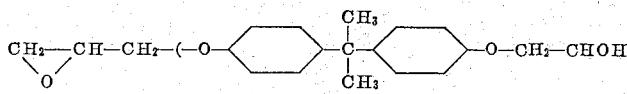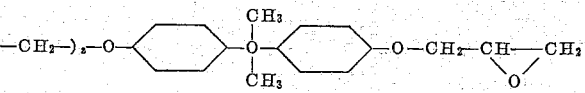

where $z$ is a whole fractional number from 0 to 2.

Furthermore, there may be used mixtures of two or more than two of the epoxy resins referred to above.

The curable mixtures of the invention may further contain suitable plasticisers, such is dibutyl phthalate, dioctyl phthalate or tricresyl phosphate, inert diluents or so-called active diluents, more especially monoepoxides, for example butylglycide or cresylglycide.

Furthermore, the curable mixtures of the invention may be mixed at any stage prior to the curing with other conventional additives, such as fillers, dyestuffs, pigments, flame-inhibitors, mould lubricants or the like. Suitable extenders and fillers are, for example, asphalt, bitumen, glass fibers, mica, quartz meal, cellulose, koalin, ground dolomite, colloidal silica having a large specific surface (Aerosil) for metal powders, such as aluminum powder.

The curable mixtures of the invention may be used, without or with fillers, if desired in the form of solutions or emulsions, as laminating resins, paints, lacquers, dipping resins, casting resins, moulding compositions, sealing compounds, pore fillers, flooring compounds, potting and insulating compounds for the electrical industry, adhesives and the like, and also in the manufacture of such products.

Parts and percentages in the following examples are by weight; the relationship between part by weight and part by volume is the same as between the kilogram and the liter.

*Example 1*

145 parts of sodium are fused and dispersed in 600 parts of xlyene. The xlyene is separated from the sodium by decantation and washing with tetrahydrofuran, whereupon 1200 parts of tetrahydrofuran, 30 parts of tertiary butanol and 0.3 part of phenyl-β-naphthylamine are added, during which the temperature rises to about 40° C. Then, in the course of 1 hour, 436 parts of freshly distilled monomeric cyclopentadiene are added dropwise. By cooling with a xylene bath the temperature is maintained at 40 to 45° C. The batch is allowed to react further for 2 hours at 35 to 40° C.; the solution is then heated to the reflux temperature and within 1½ hours 429 parts of β:β'-dichlorodiethyl ether are dropped in. The batch is allowed to react further for 1 hour at 60 to 65° C., then rapidly cooled to room temperature, neutralized with 20 parts of glacial acetic acid, and the precipitated salt is filtered off.

530 parts of acrylonitrile is heated to 60° C. and in the course of 1¼ hours an ice-cold solution (prepared as described above) of 606 parts of β:β'-dicyclopentadienyl diethyl ether in 1200 parts of tetrahydrofuran is dropped in. The batch is allowed to react further for 1 hour at 70° C., and the solvent is then distilled off under vacuum, to yield 843 parts of β:β'-bis[2-cyano-bicyclo(2:2:1)-hepten-5'-yl]diethyl ether as a low viscous, red-brown oil.

*Analysis.*—Calculated: C, 77.9; H, 7.9; N, 9.1%. Found: C, 77.5; H, 8.0; N, 8.3%.

A solution of 308 parts of the dinitrile described above in 1400 parts of methanol is saturated with 630 parts of ammonia at 0° C. 31 parts of Raney nickel are added, and the mixture is hydrogenated in an autoclave for 4 hours at 110–120° C. under a hydrogen pressure of 125 atmospheres (gauge). After having filtered off the catalyst and distilled off the solvent, there are obtained 292 parts of greenish-yellow β:β'-bis(2'-aminoethylbicyclo[2:2:1]heptyl)-diethyl ether, which has a viscosity of 1740 centipoises at 25° C. This product contains amine amounting to 85% of the theoretical content.

49.5 parts of the diamine described above are mixed with 100 parts of an epoxy resin (which is liquid at room temperature; prepared by condensing 1 molecular proportion of 4:4'-dihydroxyphenyl-dimethylmethane with at least 2 molecular proportions of epichlorohydrin in the presence of aqueous sodium hydroxide solution; containing 5.2 gram equivalents of epoxide groups per kg.) and the mixture is cast in moulds. The resulting castings have the following properties:

Flexural strength, kg./mm.² _____ 11.9
Impact strength, cm. kg./cm.² _____ 26.65
Modulus of elasticity, kg./mm.² _____ 387
Heat distortion point according to
  Martens (DIN), ° C. _____ 81
Water absorption (within 1 hour at 100° C.),
  percent _____ 0.39

A comparative experiment, performed with the use of 100 parts of the epoxy resin described above in admixture with 12.8 parts of triethylenetetramine, there are obtained castings which have the following properties:

Flexural strength, kg./mm.² _____ 13.0
Impact strength, cm. kg./cm.² _____ 13.5
Modulus of elasticity, kg./mm.² _____ 483
Heat distortion point according to
  Martens (DIN), ° C. _____ 80

In a second test 49.5 parts of β:β'-bis(2-aminomethyl-bicyclo[2:2:1]heptyl)diethyl ether and 100 parts of the epoxy resin described above are heated to 40° C. and mixed. 100 parts of this mixture are poured into a mould in which a thermometer is provided. After 28 minutes the temperature has risen to 74° C. and gelatinization occurs. After another 6 minutes the maximum exothermic reaction temperature of 168° C. is reached, whereupon the batch slowly cools down again. The casting retains its light color and displays no fissures.

In a comparative test the temperature changes during curing 100 parts of a mixture of 12.8 parts of triethylenetetramine and 100 parts of the epoxy resin described above are measured. 10 minutes after having mixed the resin with the curing agent the temperature has risen to 71° C. and the batch gels. After another 4 minutes the maximum exothermic reaction temperature of 232° C. is reached. The finally obtained casting has turned dark and fissures have appeared.

*Example 2*

145 parts of sodium metal are fused and dispersed in 1050 parts of xylene, 25 parts of tertiary butanol and 0.3 part of phenyl-β-naphthylamine are added, the whole is cooled to about 40° C. and in the course of 105 minutes 455 parts of freshly distilled cyclopentadiene are dropped in, during which the temperature should be maintained at 35 to 45° C. The batch is then allowed to react further for 2 hours at room temperature while undergoing slow cooling. 375 parts of 1:4-dichlorobutene-2 are then dropped within 2 hours into the suspension of cyclopentadiene sodium in xylene maintained at 10° C. During this operation the temperature is maintained by cooling at 10–15° C., and the batch is then allowed to react further at room temperature with stirring until the cyclopentadiene sodium has been converted completely.

The solution is neutralized with glacial acetic acid and the precipitated salt is filtered off.

In the course of 90 minutes an ice-cold solution of 552 parts of 1:4-dicyclopentadienylbutene-2 in 1050 parts of xylene (prepared as described above) is stirred dropwise into 477 parts of acrylonitrile heated at 75° C. The mixture is further heated for 1 hour at 85–90° C. After the excess acrylonitrile and the solvent have been distilled off, there are obtained 640 parts of 1:4-bis(2'-cyano-bicyclo[2:2:1]hepten-5'-yl)-butene-2.

*Analysis.*—Calculated: C, 82.72; H, 7.64; N, 9.65%. Found: C, 82.87; H, 7.75; N, 9.18%.

A solution of 290 parts of the dinitrile described above in 1400 parts of methanol is saturated at 0° C. with 606 parts of ammonia. 29 parts of Raney nickel are then added and the batch is hydrogenated in an autoclave for 11 hours at 110–120° C. under 125 atmospheres hydrogen pressure. Yield (after having filtered off the catalyst and distilled off the methanol): 287 parts of 1:4-bis(2'-aminomethyl-bicyclo[2:2:1]heptyl)-butane as a brown, low-viscous oil. This product contains 86.2% of the theoretical amount of amine.

A mixture of 38 parts of the diamine described above and 82 parts of the epoxy resin used in Example 1 (which is liquid at room temperature and contains 5.2 gram equivalents of epoxide groups per kg.) is poured into moulds and cured at room temperature. The resulting castings have the following properties:

Flexural strength, kg./mm.² _____ 12.0
Impact strength, cm. kg./cm.² _____ 21.9
Modulus of elasticity, kg./cm.² _____ 427
Heat distortion point according to Martens (DIN),
  ° C. _____ 78
Water absorption (within 1 hour at 100° C.),
  percent _____ 0.42

The gel time at an initial temperature of 40° C. is 26 minutes. The maximum exothermic reaction temperature of 157° C. is reached after 30 minutes.

*Example 3*

315 parts of methylvinyl ketone are heated to 75–80° C. while being stirred. In the course of 1 hour an ice-cold solution of 276 parts of 1:4-dicyclopentadienylbutene-2 in 525 parts of xylene (prepared as described in Example 2) is dropped in while keeping the temperature constant. The batch is stirred on for 1 hour at 80° C., and the solvent is then distilled off under vacuum, to yield 334 parts of reddish-brown, low-viscous 1:4-bis(2'-acetyl-bicyclo[2:2:1]-hepten-5'-yl)butene-2.

*Analysis.*—Calculated: C, 81.44; H, 8.70%. Found: C, 81.36; H, 8.55%.

700 parts of ammonia are injected at 0° C. into a solution of 324 parts of the diketone described above in 1400 parts of methanol; 32.5 parts of Raney nickel are added, and the batch is hydrogenated in an autoclave for 4½ hours at 110–120° C. under 125 atmospheres hydrogen pressure. Yield: 322 parts of brown, low-viscous 1:4 - bis(2' - α - aminoethylbicyclo[2:2:1]heptyl)butane which has an amine content equal to 91.5% of the theoretical.

A mixture of 47 parts of the diamine described above and 100 parts of the epoxy resin used in Example 1 (which is liquid at room temperature and contains 5.2 gram equivalents of epoxide groups per kg.) is poured into moulds and, to achieve optimum properties of the castings, heated for 2 hours at 120° C. The resulting castings have the following properties:

| | |
|---|---|
| Flexural strength, kg./mm.$^2$ | 12.8 |
| Impact strength, cm. kg./cm.$^2$ | 10.3 |
| Modulus of elasticity, kg./mm.$^2$ | 480 |
| Heat distortion point according to Martens (DIN), ° C. | 93 |
| Water absorption (within 1 hour at 100° C.), percent | 0.28 |

*Example 4*

As described in Example 1 a solution of β:β'-dimethyl-cyclopentadienyl-diethyl ether in tetrahydrofuran is prepared from 151.8 parts of dispersed sodium, 576 parts of freshly distilled commercial methylcyclopentadiene and 429 parts of β:β'-dichlorodiethyl ether and then reacted with 606 parts of acrylonitrile according to Example 1.

There is obtained a yield of 81% of β:β'-bis(2-cyano-bicyclo[2:2:1]methylhepten-5-yl)diethyl ether as a brandy-colored oil of low viscosity.

*Analysis.*—Calculated: C, 78.5; H, 8.4; N, 8.3%. Found: C, 79.4; H, 8.5; N, 7.0%.

A mixture of 300 parts of the above nitrile, 1400 parts of methanol saturated with ammonia and Raney nickel is hydrogenated at 150° C. under 150 atmospheres. Yield: 220 parts of dark-yellow β:β'-bis(2-aminomethylbicyclo[2:2:1]-methylheptyl)diethyl ether having an amine content corresponding to 83.5% of the theoretical.

A mixture of 52.5 parts of the diamine described above and 100 parts of the epoxy resin used in Example 1 (which is liquid at room temperature and contains 5.2 gram equivalents of epoxide group per kg.) is poured into moulds and cured at room temperature. The resulting castings have the following properties:

| | |
|---|---|
| Flexural strength, kg./mm.$^2$ | 13 |
| Impact strength, cm. kg./cm.$^2$ | 19 |
| Modulus of elasticity, kg./mm.$^2$ | 511 |
| Heat distortion point according to Martens (DIN), ° C. | 64 |
| Water absorption (within 1 hour at 100° C.), percent | 0.5 |

The gel time at an initial temperature of 40° C. is 25 minutes. The maximum exothermic temperature of 162° C. is reached after 5 minutes.

*Example 5*

Cyclopentadienyl sodium is prepared as described in Example 2 from 145 parts of sodium and 436 parts of cyclopentadiene in xylene. The suspension of cyclopentadienyl sodium is cooled to 15° C. and, while cooling it at 0° C., 388 parts of dichlorodimethylsilane are dropped in within 1 hour. The batch is allowed to react further for 2½ hours at 0° C., then neutralized, and the precipitated salt is filtered off.

The resulting solution of dicyclopentadienyldimethylsilane is further reacted (as described in Example 2) with acrylonitrile to form bis(2-cyano-bicyclo[2:2:1]heptenyl-5)dimethylsilane. Yield: 53%, nitrogen content 84% of the theoretical.

A solution of 65 parts of the nitrile described above in 400 parts of cold methanol saturated with ammonia is hydrogenated in the presence of 10 parts of Raney nickel for 8 hours at 150° C. under a hydrogen pressure of 150 atmospheres (initially). Yield: (after having filtered off the catalyst and expelled the solvent) 60 parts of greenish, low-viscous bis(2-aminomethyl-bicyclo[2:2:1] heptyl)dimethylsilane which contains 84% of the theoretical content of amine.

A mixture of 47.5 parts of the diamine described above and 100 parts of the epoxy resin used in Example 1 (which is liquid at room temperature and contains 5.2 gram equivalents of epoxide groups per kg.) is poured into moulds and cured at room temperature. The resulting castings have the following properties:

| | |
|---|---|
| Flexural strength, kg./mm.$^2$ | 11.9 |
| Impact strength, cm. kg./cm.$^2$ | 11.9 |
| Modulus of elasticity, kg./mm.$^2$ | 528 |
| Heat distortion point according to Martens (DIN), ° C. | 64 |
| Water absorption (within 1 hour at 100° C.), percent | 0.51 |

*Example 6*

25.3 parts of sodium are dispersed in xylene and freed from the bulk of xylene by one decantation. 250 parts of tetrahydrofuran, 5 parts of tertiary butanol and 0.1 part of phenyl-β-naphthylamine are added, and 79.2 parts of cyclopentadiene are dropped in. The batch is allowed to react further for 1 hour at 40° C., then heated to 60–65° C., and in the course of 75 minutes 224 parts of 1:4-dibromocyclopentene-2 are added dropwise. The mixture is heated for another hour at 60 to 65° C., cooled, neutralized with glacial acetic acid and the precipitated salt is filtered off.

The above solution of 196 parts of 1:4-bis(cyclopentadienyl)cyclopentene-2 in 500 parts of tetrahydrofuran/xylene is dropped within 20 minutes into 159 parts of acrylonitrile heated at 70° C. The whole is allowed to react further for 1 hour at 70° C., and the solvents are then expelled under vacuum, to yield 222 parts of dark-brown, very viscid 1:4-bis(2'-cyanobicyclo[2:2:1]hepten-5'-yl)cyclopentene-2.

*Analysis.*—Calculated: C, 83.40; H, 7.33; N, 9.26%. Found: C, 82.37; H, 7.07; N, 8.35%.

The nitrile described above is hydrogenated as described in Example 5, to yield 1:4-bis(2'-aminomethyl-bicyclo[2:2:1]-heptyl)cyclopentane in the form of a dark-yellow, highly viscous oil having an amine content corresponding to 83.7% of the theoretical.

*Example 7*

A solution of 193.6 parts of cyclopentadienyl sodium in 450 parts of tetrahydrofuran is prepared as described in Example 1. The solution is heated to the reflux temperature, and in the course of 75 minutes a solution of 203 parts of bis(chloromethyl)xylene-1:3 in 200 parts of tetrahydrofuran is dropped in. The batch is allowed to react further for 1 hour at 50° C., then cooled to about 10° C., neutralized with 15 parts of glacial acetic acid, and the precipitated salt is filtered off.

A solution of 262 parts of bis(cyclopentadienylmethyl)-xylene-1:3 in 650 parts of tetrahydrofuran is dropped within 75 minutes into 212 parts of acrylonitrile heated at 60° C. The batch is allowed to react further for 30 minutes at 65–70° C., whereupon the solvent and excess acrylonitrile are distilled off, to yield 299 parts of dark-yellow, highly viscous 4:6-bis(2'-cyanobicyclo[2:2:1]-hepten-5'-yl-methyl)-xylene-1:3.

*Analysis.*—Calculated: C, 84.74; H, 7.66; N, 7.60%. Found: C, 84.80; H, 7.76; N, 6.72%.

An autoclave of 5 liters capacity is charged with 300 parts of the dinitrile described above, 1400 parts of methanol and 40 parts of Raney nickel, and 600 parts of ammonia and hydrogen are then injected to establish a pressure of 150 atmospheres. The nitrile is hydrogenated for 10 hours at 150° C. Yield (after having filtered off the catalyst and expelled the solvent): 240 parts of greenish yellow, highly viscous 4:6-bis(2'-aminomethyl-bicyclo[2:2:1]heptylmethyl)-xylene-1:3, containing 90% of the theoretical amount of amine.

A mixture of 55 parts of the diamine described above and 100 parts of the epoxy resin used in Example 1 (which is liquid at room temperature and contains 5.2 gram equivalents of epoxide groups per kg.) is poured into moulds and cured at room temperature. The resulting castings possess the following properties:

Flexural strength, kg./mm.$^2$ _____ 13.2
Impact strength, cm. kg./cm.$^2$ _____ 14.2
Modulus of elasticity, kg./mm.$^2$ _____ 345
Heat distortion point according to Martens (DIN), ° C. _____ 141
Water absorption (within 1 hour at 100° C.), percent _____ 0.39

Example 8

A solution of 195.8 parts of cyclopentadienyl sodium in 500 parts of tetrahydrofuran is prepared as described in Example 1. The solution is heated to 40° C., and in the course of one hour a solution of 217 parts of bis(chloromethyl)mesitylene in 200 parts of tetrahydrofuran is dropped in. The batch is allowed to react further at 40° C. to complete the reaction, then cooled to room temperature, neutralized with 10 parts of glacial acetic acid, and the precipitated salt is filtered off.

A solution of 276 parts of bis(cyclopentadienylmethyl)-mesitylene in 700 parts of tetrahydrofuran is dropped within 75 minutes into 212 parts of acrylonitrile heated at 60° C. The batch is allowed to react further for one hour and the solvent and the excess acrylonitrile are then distilled off. Yield: 281 parts of solid, light-brown 2:4-bis(2' - cyano - bicyclo[2:2:1]hepten - 5' - yl - methyl)-mesitylene.

*Analysis.*—Calculated: C, 84.77; H, 7.91; N, 7.32%. Found: C, 84.65; H, 7.75; N, 6.54%.

80 parts of the dinitrile described above, 550 parts of ethanol and 15 parts of Raney nickel are introduced into a 2-liter autoclave. 400 parts of ammonia and hydrogen are injected to establish a hydrogen pressure of 150 atmospheres. The nitrile is hydrogenated for 12 hours at 150° C. Yield (after having filtered off the catalyst and expelled the solvent): 80 parts of brown, semi-solid 2:4-bis(2' - aminomethyl - bicyclo[2:2:1]heptylmethyl)mesitylene which contains 89% of the theoretical amount of amine.

A mixture of 40 parts of the diamine described above and 70 parts of the epoxy resin used in Example 1 (which is liquid at room temperature and contains 5.2 gram equivalents of epoxide groups per kg.) prepared at about 50° C. is poured into moulds and cured without supplying further heat, to yield castings having the following properties:

Flexural strength, kg./mm.$^2$ _____ 4.6
Impact strength, cm. kg./cm.$^2$ _____ 3.1
Heat distortion point according to Martens (DIN), ° C. _____ 97
Water absorption (1 hour at 100° C.), percent ____ 0.33

Example 9

A solution of 147 parts of cyclopentadienyl sodium in 380 parts of tetrahydrofuran is prepared as described in Example 1. This solution, having a temperature of 20 to 25° C., is mixed in the course of 105 minutes with a suspension of 175 parts of bis-chloromethyl-durene in 70 parts of tetrahydrofuran, and the batch is allowed to react further for one hour at room temperature. The solution is then cooled to 0° C., neutralized with 22 parts of glacial acetic acid, and the precipitated salt is filtered off.

In the course of 1½ hours a solution of 218 parts of bis(cyclopentadienyl-methyl)durene in 450 parts of tetrahydrofuran is added dropwise into 161 parts of acrylonitrile previously heated to 60° C. The batch is allowed to react further for 1 hour at 70° C., and the solvent and the excess acrylonitrile are then distilled off, to yield 220 parts of dark-brown, solid bis(2'-cyanobicyclo-[2:2:1]hepten-5'-yl-methyl)durene.

*Analysis.*—Calculated: C, 84.80; H, 8.13; N, 7.06%. Found: C, 83.17; H, 7.89; N, 6.16%.

200 parts of the dinitrile described above, 1500 parts of ethanol and 37.5 parts of Raney nickel are introduced in a 5-liter autoclave. 900 parts of ammonia and 150 atmospheres of hydrogen are then injected and the batch is hydrogenated for 15 hours at 150° C. Yield (after having filtered off the catalyst and expelled the solvent): 150 parts of dark-brown, solid bis(2'-aminomethyl-bicyclo[2:2:1]-heptyl-methyl)durene containing 84% of the theoretical amount of amine.

A mixture of 69 parts of the diamine described above and 100 parts of the epoxy resin used in Example 1 (which is liquid at room temperature and contains 5.2 gram equivalents of epoxide groups per kg.) prepared at 55–60° C. is poured into moulds and cured without supplying further heat. The resulting castings have the following properties:

Flexural strength, kg./mm.$^2$ _____ 4.6
Impact strength, cm. kg./cm.$^2$ _____ 3.1
Modulus of elasticity, kg./mm.$^2$ _____ 360
Heat distortion point according to Martens (DIN), ° C _____ 94
Water absorption (within 1 hour at 100° C., percent _____ 0.38

What is claimed is:
1. A diamine of the formula

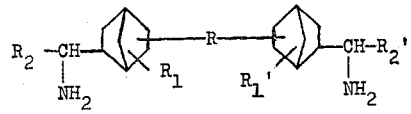

where R is a divalent radical selected from the group consisting of

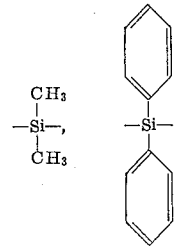

alkylene radical with at the most 5 carbon atoms, -alkylene-O-alkylene-, wherein alkylene has the same meaning as above, and a radical —CH$_2$—A—CH$_2$—, where A is a member selected from the group consisting of the phenylene radical and phenylene radical substituted by at the most 4 methyl groups, and where R$_1$, R$_1'$, R$_2$ and R$_2'$ each is selected from the group consisting of hydrogen atom and the methyl group.

2. 4:6 - bis(2' - aminomethyl - bicyclo[2:2:1]heptylmethyl)-1:3-dimethylbenzene.

3. β:β - bis(2-aminomethyl - bicyclo[2:2:1]heptyl)diethyl ether.

4. 1:4 - bis(2'-aminomethyl - bicyclo[2:2:1]heptyl) butane.

5. 1:4-bis(2' - α-aminomethyl - bicyclo[2:2:1]heptyl) butane.

References Cited by the Examiner
UNITED STATES PATENTS

| | | | |
|---|---|---|---|
| 2,759,977 | 8/1956 | Gerzon et al. | 260—570.9 |
| 2,762,823 | 9/1956 | Speier | 260—448.2 |
| 2,843,587 | 7/1958 | De Benneville | 260—563 X |
| 2,894,987 | 7/1959 | Stein et al. | 260—563 |

(Other references on following page)

UNITED STATES PATENTS

| | | |
|---|---|---|
| 2,921,037 | 1/1960 | Andres et al. _____ 260—2 |
| 2,992,192 | 7/1961 | Ingberman _____ 260—2 |
| 3,014,966 | 12/1961 | Treifelder et al. _____ 260—563 |
| 3,115,524 | 12/1963 | Shapiro et al. |

FOREIGN PATENTS

| | | |
|---|---|---|
| 945,391 | 7/1956 | Germany. |
| 1,001,257 | 1/1957 | Germany. |

OTHER REFERENCES

Alder et al.: Ber. Deut. Chem., vol. 88, pp. 144–155.
Culberson et al.: J. Org. Chem., vol. 27, pp. 4205–4210.

CHARLES B. PARKER, *Primary Examiner.*

F. D. HIGEL, *Assistant Examiner.*

UNITED STATES PATENT OFFICE
CERTIFICATE OF CORRECTION

Patent No. 3,264,350                          August 2, 1966

Alfred Renner et al.

It is hereby certified that error appears in the above numbered patent requiring correction and that the said Letters Patent should read as corrected below.

Column 10, line 61, for "$\beta:\beta$" read -- $\beta:\beta'$ --.

Signed and sealed this 22nd day of August 1967.

(SEAL)
Attest:

ERNEST W. SWIDER                          EDWARD J. BRENNER
Attesting Officer                               Commissioner of Patents